(12) United States Patent
Hessel (10) Patent No.: US 7,315,588 B2
(45) Date of Patent: Jan. 1, 2008

(54) SYSTEM AND METHOD FOR ENHANCED ACQUISITION FOR LARGE FREQUENCY OFFSETS AND POOR SIGNAL TO NOISE RATIO

(75) Inventor: Clifford Hessel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 782 days.

(21) Appl. No.: 10/406,251

(22) Filed: Apr. 4, 2003

(65) Prior Publication Data

US 2004/0196928 A1    Oct. 7, 2004

(51) Int. Cl.
*H04L 27/06* (2006.01)

(52) U.S. Cl. .................. 375/340; 375/316; 375/343; 375/326

(58) Field of Classification Search ............... 375/316, 375/340, 343, 326, 354, 355, 362–366; 370/503, 370/509–514

See application file for complete search history.

(56) References Cited

U.S. PATENT DOCUMENTS 3,602,826 A * 8/1971 List et al. .................. 327/70
2003/0220786 A1* 11/2003 Chandran et al. ........... 704/205

* cited by examiner

*Primary Examiner*—Mohammed Ghayour
*Assistant Examiner*—Leila Malek
(74) *Attorney, Agent, or Firm*—Duane Morris LLP (57) ABSTRACT

A system and method is herein described for the wide band acquisition of a high performance waveform in an environment with poor signal to noise ratio. The waveform acquired has a preamble with a plurality of frequency modulated Maximum Length Sequences and a period of pure carrier. In one embodiment, method provides an application specific integrated circuit (ASIC) for receiving the waveform, filter coefficients for use with the MLS's portion of the waveform, and filter coefficients for the pure carrier portion of the signal. Another embodiment may also include, for the MLS portion of the signal, detecting the signal through partial correlation, extracting waveform information, and estimating symbol timing. Yet another embodiment may further include, for the pure carrier portion of the signal, estimating the phase and frequency of the signal and providing those estimates to an ASIC.

45 Claims, 7 Drawing Sheets

SYSTEM AND METHOD FOR ENHANCED ACQUISITION FOR LARGE FREQUENCY OFFSETS AND POOR SIGNAL TO NOISE RATIO

BACKGROUND OF THE INVENTION

The subject matter of the application deals with acquisition of High Performance Waveforms ("HPW").

In order for a receiver to glean the information from a transmitted signal, the carrier frequency and phase of the signal must be determined and or synchronized. Typical transmitter and receiver pairs have matched expected transmit and receive frequencies. Thus signals sent by a transmitter possess a carrier frequency known or expected by associated receivers. The receiver pass band must be wide enough to accommodate not only the information-bearing signal, but also any fluctuation in the carrier, due perhaps to Doppler shift or drift in the transmitters frequency reference. Such transmitter errors and propagation characteristics can cause a frequency offset to be present.

Doppler shift is a characteristic of propagation that commonly produces a frequency offset as perceived by the receiver from the nominally transmitted frequency caused by relative motion of the transmitter and receiver. Ignoring higher order effects, the value of the frequency offset )f, is given by $Vf_0/c$, where V is the relative velocity, $f_0$ the nominal frequency and c the speed of light.

This requirement in the receiver pass band results in additional noise energy passing over and above the amount theoretically required by the bandwidth of the information. Thus the frequency offset can result in a deterioration of the signal to noise ratio (SNR) to a degree that the signal is not easily distinguishable from non-signal noise by the receiver. The frequency offset additionally can reduce the capability of the receiver to retrieve the information contained in the signal.

Complicated receivers that employ a carrier frequency tracking loop are able to keep a narrow passband filter centered about the carrier, thereby substantially reducing the detected noise energy and improving the received SNR. However, large frequency offsets can prevent the tracking loop from even obtaining the signal.

Another consequence of an offset that occurs from time to time, especially for high frequency offsets between transmitter and receiver, is a phenomenon known as a "click", which leads to a high estimation error of the carrier phase and frequency. Through sampling of the signal, complex samples travel a complete circle around the origin of the imaginary plane. However, if the influence of noise is significant enough, the path of the samples might not include the origin, this phenomena resulting in the accumulation of the phase missing 2B, or a click.

The subject matter in this application addresses the detection of large frequency offset signals with a preamble of frequency modulated Maximum Length Sequences (MLS's) and a predetermined period of pure carrier along with probable frequency offsets to widen the acquisition bandwidth. The subject matter described herein also addresses the detection and correction of clicks.

Accordingly, it is an object of the present invention to obviate many of the above problems in the prior art and to provide a novel method of wide band acquisition of a high performance waveform, in an environment with poor signal to noise ratio. The waveform having a preamble with a plurality of frequency modulated Maximum length sequences and a period of pure carrier. In one embodiment, an inventive method provides an application specific integrated circuit (ASIC) for receiving the waveform, filter coefficients for use with the MLSs portion, and filter coefficients for the pure carrier portion of the signal. This method may also include for the MLS portion of the signal, detecting the signal through partial correlation, extraction of waveform information, and estimation of symbol timing. The method may further include for the pure carrier portion of the signal, estimating the phase and frequency and providing such estimates to the ASIC.

It is another object of the present invention to provide a novel system and method for detecting a communication signal in an environment with poor signal to noise ratio, the signal including a preamble with a plurality of frequency modulated MLS and a predetermined period of pure carrier. In another embodiment, the method involves receiving a candidate signal, sampling the candidate signal a plurality of times for each symbol, and calculating a weighted frequency. From the weighted frequencies a $1^{st}$ and $2^{nd}$ attribute one calculated and the attributes are compared to determine whether a communication signal has been detected.

It is yet another object of the present invention to provide a novel system and method for detecting a narrow band communication signal in an environment with poor signal to noise ratio, the signal including a preamble with a plurality of frequency modulated MLS and a predetermined period of pure carrier. A further embodiment of the present invention may be a system and/or method of applying the candidate signal to a first mixer tuned to the expected carrier frequency to obtain a first intermediate signal, and supplying the first intermediate signal to a central processing branch, comprising x number of upper parallel processing branches and y number of lower parallel processing branches. The processing branches, sample a plurality of times each symbol in the intermediate signal, calculate a weighted frequency, calculate a $1^{st}$ and $2^{nd}$ attribute and compare the attributes to determine whether a communication signal has been detected.

It is still another object of the present invention to provide a novel system for detecting a communication signal with a large frequency offset in an environment with a poor signal to noise ratio, the signal with a preamble including a plurality of MLS sequences and a pure carrier signal. A still further inventive system includes a first mixer and first filter, a central processing branch, comprising x number of positive processing branches and y number of negative processing branches for processing an intermediate signal. Each processing branch may include a limiter for removing a DC offset, a correlator and a logic circuit. The system may also include an adjustable first filter and an adjustable first mixer one or both of which may be adjusted with output of logic circuits.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
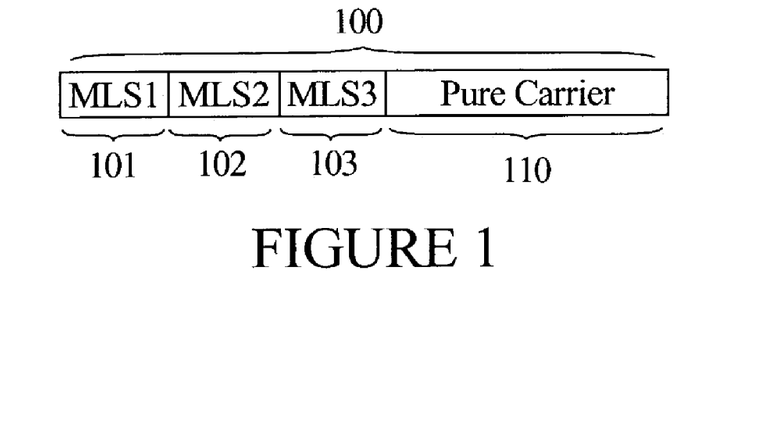
FIG. 1 is a representation of the preamble structure.

Acquisition of the HPW waveform is achieved via a preamble, which is located in the first part of each burst. The preamble is used to provide burst detection, symbol timing estimation carrier phase and frequency estimation and also provides information regarding the data waveform. The preamble consists of a plurality of consecutive MLS's followed by a period of pure carrier. In a particular embodiment shown in FIG. 1, the preamble 100 has three MLS's 101, 102 and 103 with 31 symbols each at a 8 kbps rate, frequency modulated with a 2.5 kHz frequency deviation followed by a period of pure carrier 110.

Each of the three MLS's can either contain the following symbols:

MLS(k)=(−1,1,−1,1,1,1,−1,1,1,1,−1,−1,−1,1,1,1,1,1,1,−1,−1, 1,1,−1,1,−1,−1,1,−1,−1,−1,−1,1) or an inverted version containing the following symbols:

$\overline{MLS}$(k)=(1,−1,1,−1,−1,−1,1,−1,−1,−1,1,1,1,−1,−1,−1,−1,−1, 1,1,−1,−1,1,−1,1,1,−1,1, 1,1,1,−1).

Each of the MLS in the present embodiment has a duration of 31/8000 seconds. The pure carrier portion has a duration of 1536/120000 seconds, making the total duration of the preamble 23.7 msec. Other durations apart from the example above are envisioned and should not be construed to be preempted by exclusion herein.

Figure 2:
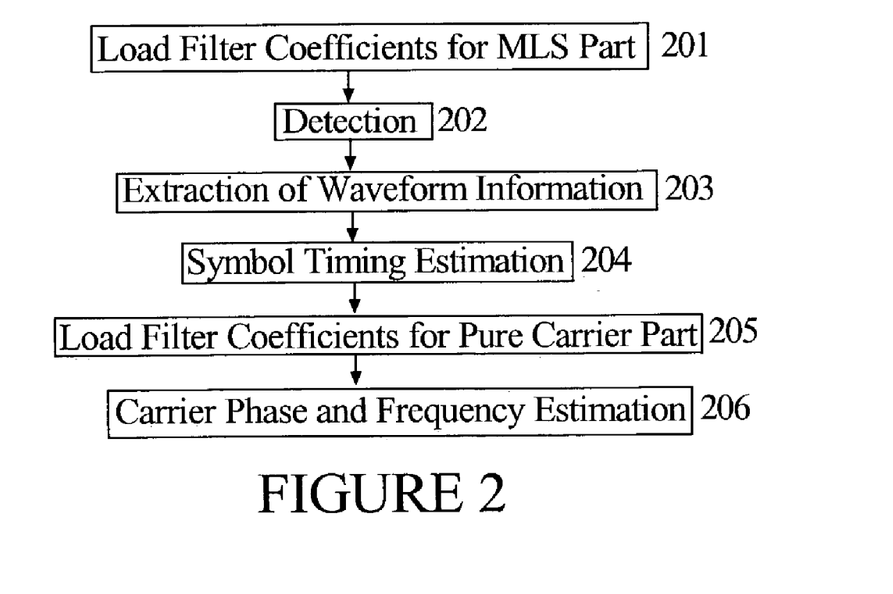
FIG. 2 is a flowchart for acquisition of a high performance waveform according to an embodiment of the present invention.

A receiver includes an associated Application Specific Integrated Circuit (ASIC) to receive the high performance waveform. After the end of receiving a previous burst, the receiver is in a detection mode, the elements of such operation is shown in FIG. 2. The filter coefficients appropriate for the MLS part of the preamble are loaded or activated in the ASIC as shown in block 201. The filter coefficients and the associated filter function as those known in the art, in a particular embodiment a 127 tap square root Nyquist filter with a roll off factor of $\forall$=0.79 is used. A candidate communication signal is applied to the filter and a detection algorithm 202 is run to determine if a communication signal has been detected. The detection algorithm 202 partially correlates the MLS portion of the signal in the process of detection. A particular detection algorithm 202 is described latter herein in greater detail but does not preclude other detection algorithms.

Upon detection of a burst (communication signal), information regarding the data waveform and header is extracted from the signal, as shown in block 203 and the receiver switches into a hunting mode for the peak correlation in order to estimate the symbol timing in block 204. After symbol timing is accomplished, new filter coefficients for the pure carrier portion are loaded into the ASIC as shown in block 205. The new filter coefficients function similarly to the MLS filter coefficients except they act upon the pure carrier portion. The filter for the pure carrier portion in the present embodiment uses a 127-tap low pass filter. The carrier phase and frequency are estimated in thereafter in Block 206. This estimation is done as soon as the last sample of the pure carrier is available. The ASIC must then load an associated set of filter coefficients for use with the header and the data that follow the preamble 100 (not shown).

Figure 3:
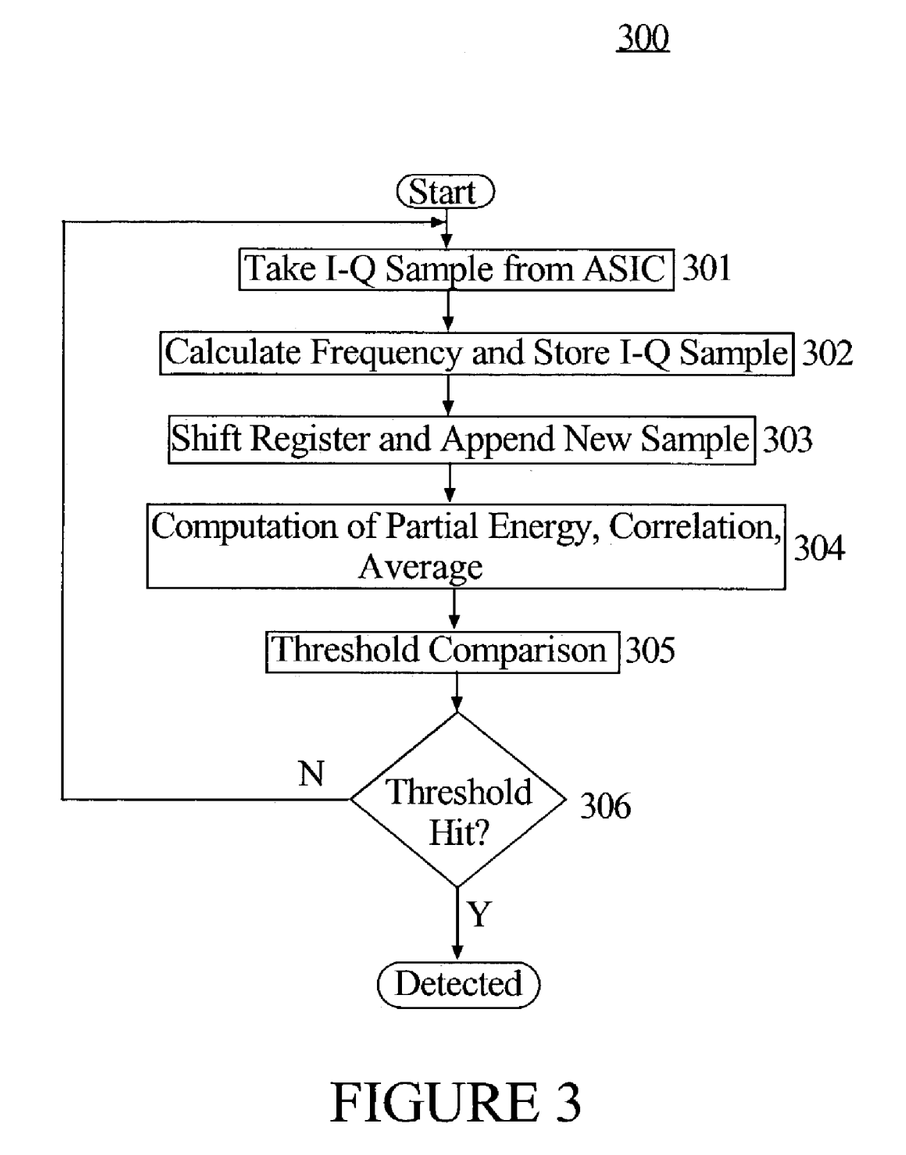
FIG. 3 is a detection algorithm for an embodiment of the present invention.

A particular detection algorithm 300 is shown in FIG. 3. A candidate signal is received in the ASIC where the signal is sampled a plurality of times per symbol in block 301. The samples of the received signal are inphase and quadrature samples that are for example available at a 64 kbps. Each of these samples are used in the detection algorithm.

In Block 302 weighted frequencies are calculated from successive samples of the symbols. The current n I-Q sample represented as z[n]=Re {z[n]}+i·Im {z[n]} is used together with the previous sample z[n−1] to calculate the weighted phase difference, which is a function of the frequency. The phase of the sample z[n] which are close to the origin in the complex plane is much more sensitive to Additive White Guassian Noise (AWGN) then the phase samples with larger magnitudes, therefore rather or in addition to calculating the frequency with the help of a discriminator, the weighted frequency is derived using the equation:

$$\tilde{f}[n]=Re\{z[n]\}\cdot Im\{z[n-1]\}-Im\{z[n]\}\cdot Re\{z[n-1]\}$$

This equation stems from:

$$f(t) = \frac{1}{2\pi}\frac{d\Phi(t)}{dt} = \frac{1}{2\pi}\frac{d\arctan\left(\frac{y(t)}{x(t)}\right)}{dt}$$

$$= \frac{1}{2\pi}\frac{1}{1+\left(\frac{y(t)}{x(t)}\right)^2}\frac{\frac{dy(t)}{dt}x(t)-y(t)\frac{dx(t)}{dt}}{x^2(t)} \Rightarrow f[k]$$

$$= \frac{1}{2\pi T_S}\frac{y[k]x[k-1]-x[k]y[k-1]}{|z[k]|^2} = \frac{1}{2\pi T_S}\cdot\tilde{f}[k]\cdot\frac{1}{|z[k]|^2}$$

Hence, phase samples, which originate from samples with larger magnitudes, are amplified whereas phase samples from samples with smaller magnitudes are attenuated. Since the current I-Q sample z[n] is used in the subsequent calculation of the weighted frequency f[n+1], the sample is stored in a shift register or other appropriate storage device.

Block 303 represents shifting the storage register and appending the new frequency sample previously calculated. In the present embodiment with 3 MLS's of 31 symbols with a sample rate of 64 kbps at the output of the ASIC and a symbol rate of 8 k there are 744 samples for the complete MLS part. The overall length of the shift register for storage of the samples is at least 746, allowing two or more previously calculated frequency samples to be stored for the peak correlation. When a new frequency sample has been calculated the register is shifted and the new frequency sample is appended.

Figure 4:
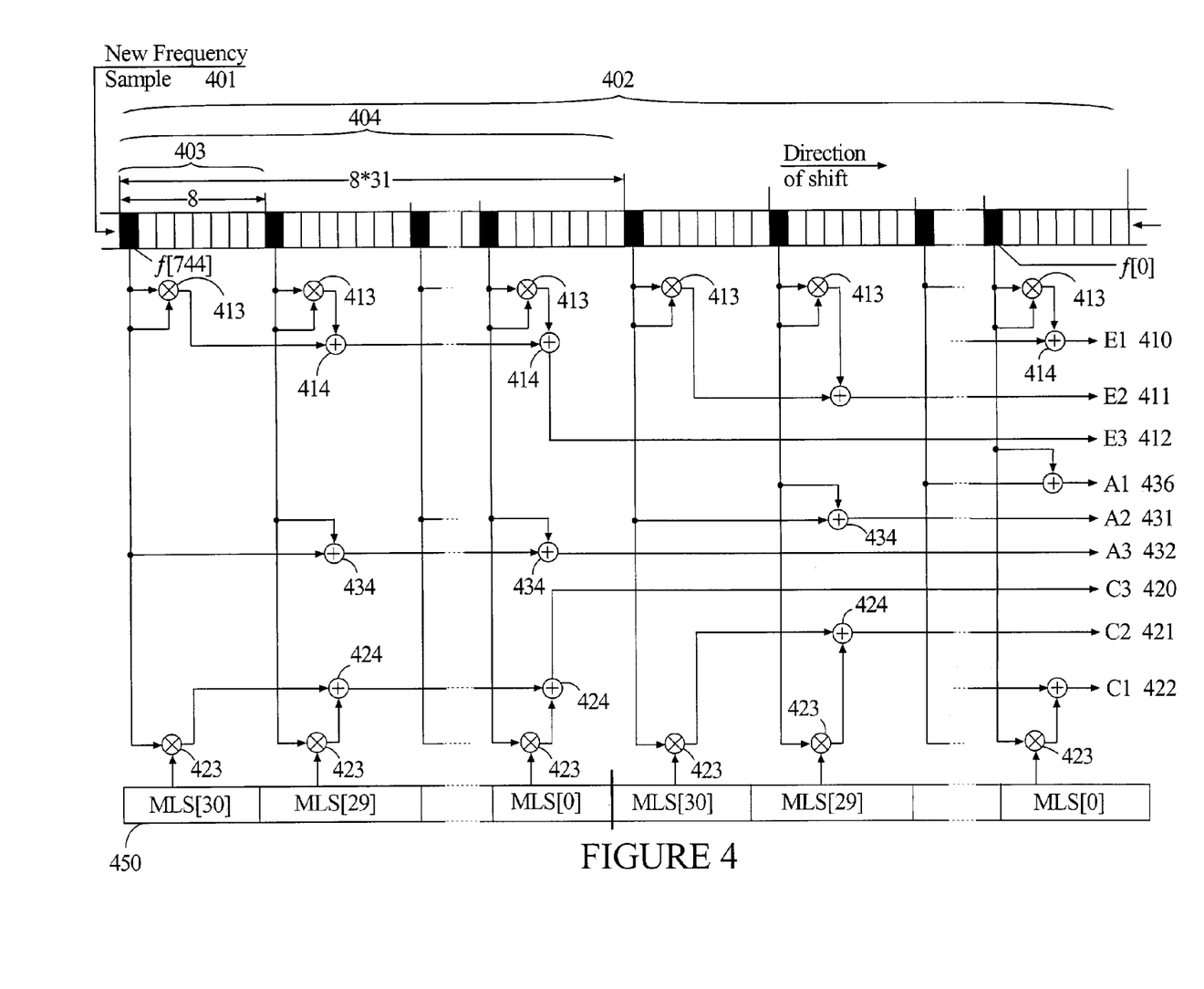
FIG. 4 is a schematic representation for computation of attributes according to an embodiment of the present invention.

In order to make a decision whether a burst or communication signal has been received, the receiver computes for each of the three MLSs 101, 102 and 103, the partial energies, the partial correlation and partial averages every time a new frequency sample is available as indicated in block 304. The mechanism for obtaining these attributes, partial energy, partial average and partial correlation is shown in FIG. 4. These quantities are partial in that out of the available samples per symbol, in the present embodiment 8, only one is used for each computation. The frequency samples 402 represent the symbols 403 of the MLSs 404. The new frequency sample is shown as 401 in FIG. 4.

The partial energy (E) represents the sum of the square frequency samples as shown:

$$E_i = \sum_{n=M}^{M+30} f^2[k \cdot n]$$

where k=number of samples per symbol, and i=1 to the number of MLS sequences and M=(i−1)·j+1 in the present embodiment k=8 and j=31. Therefore i partial energies $E_i$ are calculated resulting in three partial energies $E_1$ 410, $E_2$ 411, and $E_3$ 412. The frequency sample is squared and multiplied in multipliers 413 and summed with the output of the other frequency sample multipliers 413 of the respective MLS by summers 414.

The partial correlation (C) represents the sum of the product of the samples with the not inverted MLS, which is known in by the receiver. The partial correlation is obtained with the following equation:

$$C_i = \sum_{n=M}^{M+30} f[k \cdot n] \cdot MLS[n - M]$$

Likewise three values are obtained for $C_1$ 421; $C_1$ 422; $C_2$, and $C_3$ 423. Where the frequency samples 401 are multiplied by the MLS known values 450 by multiplier 423 and summed by summer 424.

For carrier offset correcting purposes, the partial average, which represents the sum of the samples is calculated for each MLS as follows:

$$A_i = \sum_{n=M}^{M+30} f[k \cdot n]$$

resulting in $A_1$ 430, $A_2$ 431 and $A_3$ 432. Where the frequency samples 402 are summed by summer 434.

The partial energies, partial correlation and partial averages represent signal attributes either alone or mathematical combinations of each other. The attributes derived from these elements are used in block 305 for the threshold comparison.

In a particular embodiment the partial energies, correlation and averages are used to determine a $1^{st}$ attribute and a second attribute for each of the MLSs. The $1^{st}$ attribute, a function of the partial energy, partial correlation and overall average is:

$$E_i - A \cdot (C_i)^2$$

The $2^{nd}$ attribute, a function of the partial average is:

$$\frac{1}{j} \cdot (A_i)^2$$

for each of the MLS's the attributes are compared for compliance to the following inequality:

$$E_i - A \cdot (C_i)^2 < \frac{1}{j} \cdot (A_i)^2$$

If and only if the equality holds true in block 306 for each of the MLS is the threshold reached indicating the detection of a communication signal or burst. Other thresholds could also be applied and are not foreclosed by the description of the present embodiment.

Figure 5:
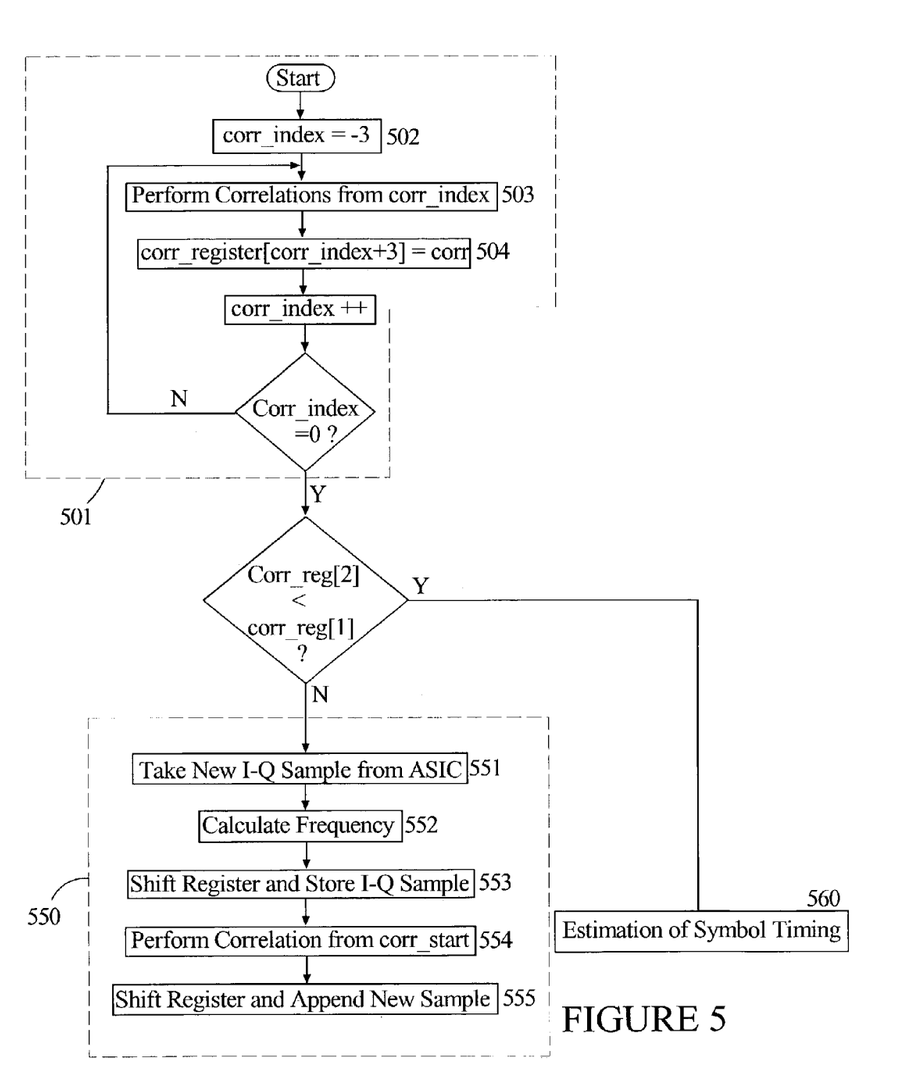
FIG. 5 is a flowchart for symbol timing estimation.

After a signal has been detected, a search for the peak correlation value is started. At this time, all the available 744 frequency samples stored in the shift register are used and the correlations are performed with the filtered MLS response. The response has a length of 248 samples and is stored in a memory. FIG. 5 shows the implementation of symbol timing estimation algorithm for symbol timing estimation in Block 205 the first loop 501 sets up a register with three full correlation values, as shown in block 502, the correlation values are obtained in block 503 where Corr [0] is the correlation value, taken 2 time steps back form the time instant a signal was detected. This is why the shift register for the frequency samples as discussed earlier is at least 746. Analogously corr [1] contains the full correlation value one-time step back and corr [2] is the full correlation value at the time instant the signal is detected as implemented in block 504. If corr[1] contains the peak value, the second loop in FIG. 5 is not entered and the symbol timing is estimated in block 560, otherwise the second loop calculates the next correlation value and appends it to the shifted register. The second loop 550 takes new signal samples for the ASIC block 551, Calculates Frequency in block 552, shifts the register and store the frequency sample in block 553, performs correlation in block 554 ans shifts the register and appends new correlation sample in block 555. Loop two 550 is executed until the peak correlation is found and then the estimation is started.

The full correlation is performed with all 744 frequency samples in the register and a filter MLS response of Length 248 stored in memory. Thus three full correlations values are calculated one for each of the MLS's as follows;

$$C_i = \sum_{n=kM}^{(k(M+30))} f[n] \cdot \text{filtered\_MLS}[n - M \cdot k]$$

The value $C=C_1^2+C_2^2+C_3^2$ is stored in the correlation register. As soon as the peak correlation have been found and stored in corr[1], the offset )t to the peak correlation as a fraction of the sampling time $T_S$ is computed via:

$$\frac{\Delta t}{T_S} = \frac{1}{2} \cdot \frac{corr[0] - corr[2]}{corr[0] - 2 \cdot corr[1] + corr[2]}$$

Figure 6:
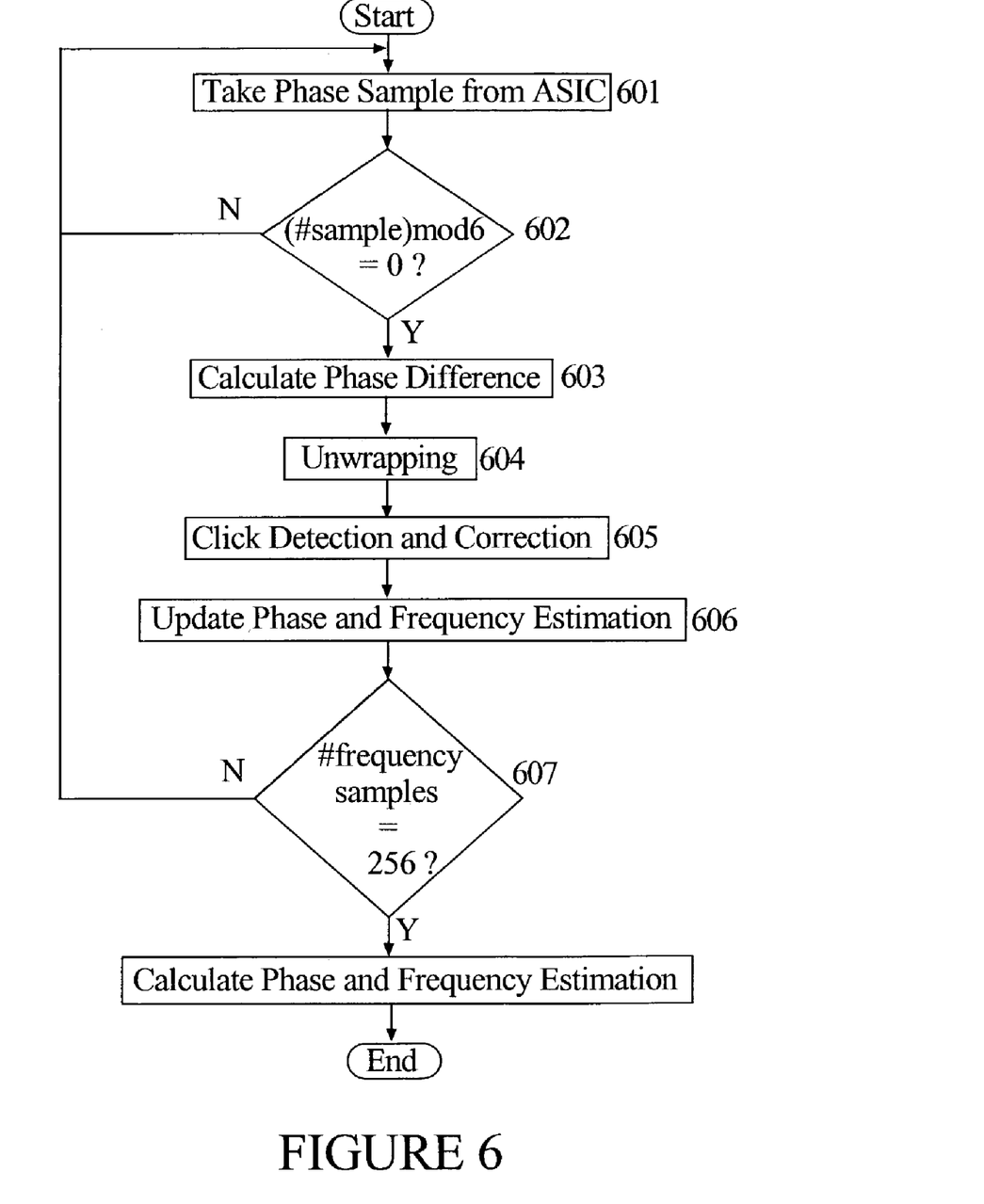
FIG. 6 is a flowchart for carrier phase and frequency estimation according to an embodiment of the present invention.

The flow chart for estimating the carrier phase and frequency estimation of block 205 is shown in FIG. 6. As opposed to the MLS portion of the preamble, carrier phase and frequency estimation is done with a not weighted computation of the frequency samples. The frequency samples are computed from phase sample from the ASIC. Because the highly correlated nature of the pure carrier waveform, a smaller number of samples can be used. In the present embodiment only every 6$^{th}$ sample is used. These phase samples are accessed from the ASIC in block 601 and every 6$^{th}$ one is selected in decision block 602.

The phase difference )M is calculated in block 603 by subtracting successive phase samples selected in block 602 as shown below:

$$\Delta\Phi = \phi[n] - \phi[n-k]$$

where k is the interval between the samples selected, in the present embodiment k=6.

Since the phase is limited within the range of −B and B, and the phase difference )M can vary between −2B and 2B, the phase difference is "unwrapped" in block 604. The process of unwrapping resolves this ambiguity. Phase differences larger than B are reduced by 2B and phase differences smaller then −B, are increased by 2B as demonstrated below;

$$\Delta\tilde{\Phi} = \begin{cases} \Delta\Phi + 2\pi, & \text{if } \Delta\Phi \leq -\pi \\ \Delta\Phi - 2\pi, & \text{if } \Delta\Phi > \pi \\ \Delta\Phi, & \text{otherwise} \end{cases}$$

Figure 7:
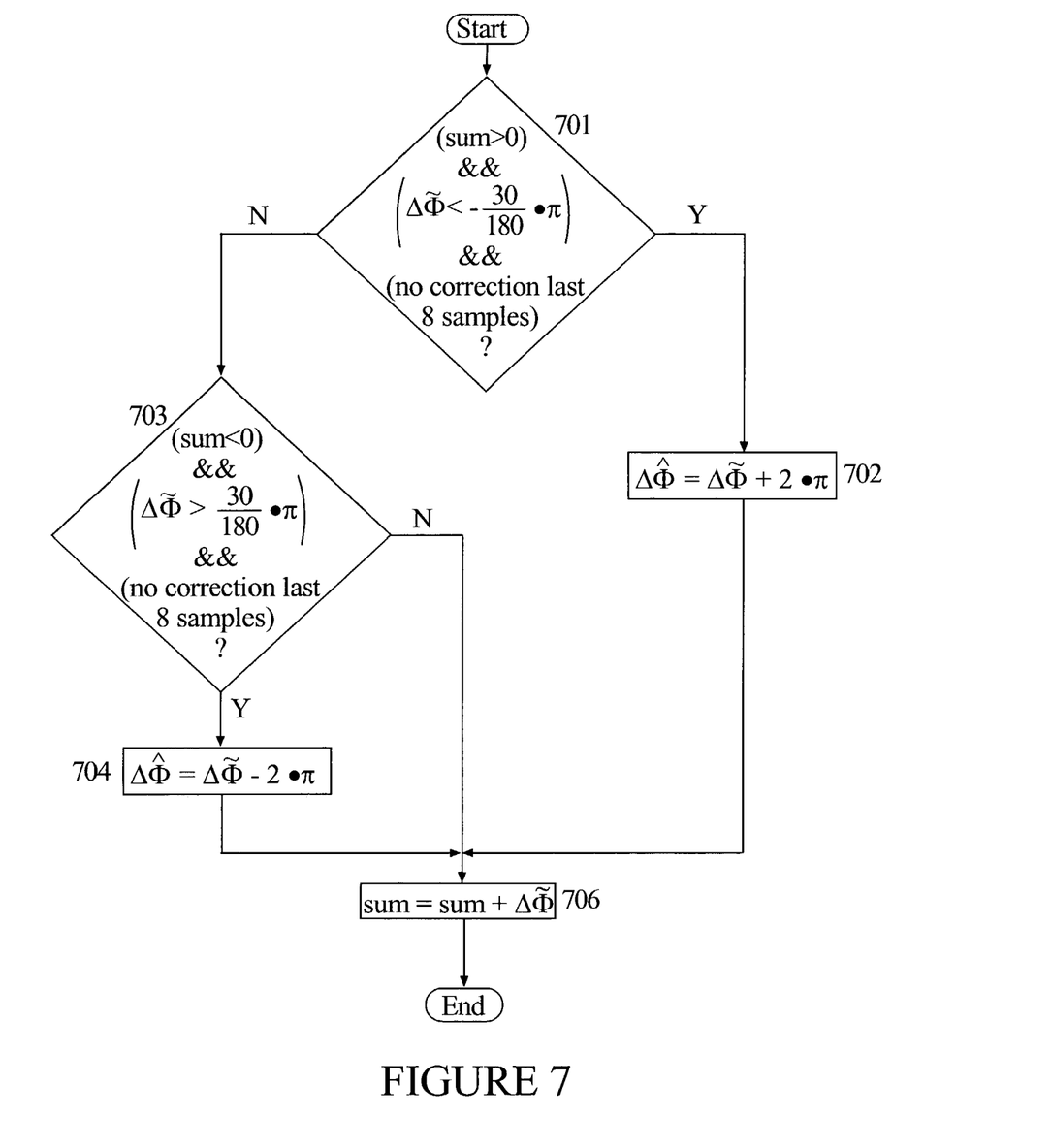
FIG. 7 is a flowchart for click detection and correction according to an embodiment of the present invention.

Click detection and correction is accomplished in block 605. As noted earlier, high frequency offsets greater than 800 Hz between the transmitter and receiver for the present embodiment can lead unacceptable high estimation error in the carrier phase and frequency. The detection and correction algorithm is shown in FIG. 7. The click is detected and correct with the use of a running summer, which add all phase deference samples obtained and a threshold comparison.

The decision block 701 determines if the running sum is greater than zero, $$\Delta\tilde{\Phi} < -\frac{30}{180}\pi$$

and if the phase was not corrected in the last 8 samples. Upon a positive decision of all three a click is detected and corrected in block 702 resulting in a corrected phase difference of $\Delta\hat{\Phi}=\Delta\tilde{\Phi}+2\pi$. If the result of block 701 is negative, decision block 703 determines if the sum is less than zero, if $$\Delta\tilde{\Phi} > \frac{30}{180}\pi$$

and if the phase was not corrected in the last 8 samples. A positive decision indicates a detection of a click and the phase difference is corrected in block 704 resulting in a corrected phase difference of $\Delta\hat{\Phi}=\Delta\tilde{\Phi}-2\pi$. If the decision of block 703 is negative the phase difference remains uncorrected. The uncorrected phase difference is added to the running sum in block 706.

The phase and frequency estimation of the pure carrier is then updated in block 606 of FIG. 6. The estimation can be implemented as a Finite Impulse Response (FIR) filter. The phase difference samples $\Delta\hat{\Phi}$ after the click correction are summed up and the new summation value is applied to filters for slope and intercept estimation. The phase differences are summed according to $\Delta\hat{\Phi}[n]=\Delta\hat{\Phi}[n-1]+\Delta\hat{\Phi}$ where the slope and intercept are determine from:

slope[*n*]+slope[*n*−1]+*a[n]*·$\Delta\hat{\Phi}$*[n]*;

int rcept[*n*]=int ercept[*n*]+*b[n]*·$\Delta\hat{\Phi}$*[n]*;

Where the filter coefficients a[k] and b[k] are computed as follows:

$$a[k] = 6 \cdot \frac{2 \cdot k - N - 1}{N \cdot (N^2 - 1)}; \text{ and,}$$

$$b[k] = 2 \cdot \frac{2 \cdot N + 1 - 3 \cdot k}{N \cdot (N - 1)}$$

Where N represents the number of samples used for the estimation which in the present embodiment N=256. Block 607 determines all the frequency samples have been taken from the ASIC and the phase and frequency estimations are calculated in block 607.

As b[N] is the least mean square estimate of the interception, and thus the phase offset between the transmitter and receiver. A[N], on the other hand, is the LMS estimate of the phase change between two samples, which were used for the estimation. Thus the frequency offset is therefore given as:

$$f_{offset} = \frac{1}{2\pi} \frac{\Delta\Phi}{\Delta t} = \frac{1}{2\pi \cdot 6 \cdot T_S} \cdot \text{slope}[N] = \frac{64 \text{ kHz}}{2\pi \cdot 6} \cdot \text{slope}[256]$$

The frequency offset, once quantified, is used to refine the expected receive frequency of the receiver for subsequent reception of the information bearing portion of the communication signal. This refinement can include changes to the VCO and/or the front-end filter.

In narrow band operation, the relative frequency offset is on the order of 5 times larger than during wide band operation. Such a frequency offset lends itself to signal detection with an additional embodiment utilizing parallel processing of the preamble. The processing substantially mimics the detection method described in FIG. 3.

In signal detection in multiple parallel processing branches, the candidate signal is mixed with a frequency selected with respect to the expected carrier frequency in order to obtain the desired intermediate signal at a desired intermediate frequency. The intermediate signal is applied to a central processing branch, as well as upper and lower processing branches. The number of upper and lower processing branches need not be limited.

In the upper and lower parallel processing branches a respective signal associated with a predetermined frequency offset is mixed with the intermediate signal resulting resulting in a respective intermediate signal for each of the processing branches. Each branch processes the intermediate signal as if the signal has a carrier frequency with a frequency offset associated with the particular processing branch. The frequency of the respective signal is selected to account for positive and negative frequency offset or deviation between the expected transmitted signal and the receive frequency. In an embodiment the upper processing branch is associated with a 800 kHz positive frequency offset and the lower processing branch is associated with a negative frequency offset of 800 kHz. In embodiments with a plurality of upper and lower branches the associated frequency offsets can be incremented between the expected receive frequency and the predetermined maximum frequency offsets.

In each branch, the detection algorithm of FIG. 3 is followed. Upon detection of a communication signal in one of the processing branches the mixer is supplied feedback for adjusting its frequency appropriate for a received signal at the offset frequency associated with the respective processing branch. If multiple processing branches detect a signal is present. The SNR is used to determine the frequency closest to the incoming carrier. The frequency offset for the selected processing branch is used as the initial frequency estimate and the signal is considered to have been acquired.

Figure 8:
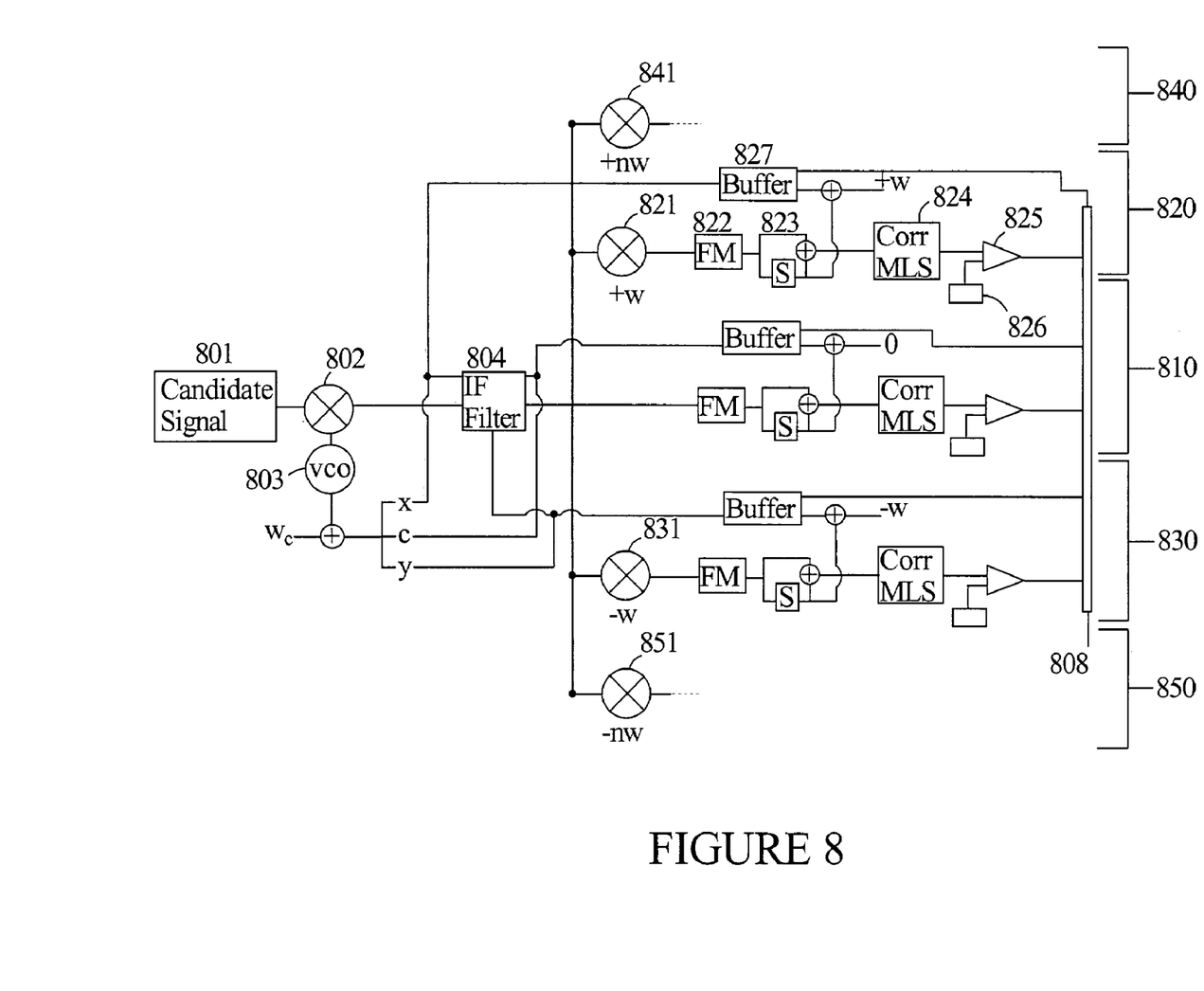
FIG. 8 is a schematic representation of an apparatus for signal detection according to an embodiment of the present invention.

FIG. 8 shows an embodiment of narrow band signal detection with plural parallel processing branches. The candidate signal is received at the receiver 801. The candidate signal is mixed with a signal with a frequency associated with the expected received signal frequency $T_c$ at mixer 802 supplied by a Voltage Controlled Oscillator (VCO) 803 or other Oscillating means. An intermediate signal with a intermediate frequency created by the mixed signals is filtered by a filter 804. The filtered intermediate signal is then applied to each of the processing branches 810, 820, 830, 840 and 850 respectively. The filtered intermediate signal is then mixed in the upper branches 820 and 840, and the lower branches 830 and 850 by respective mixers 821, 841, 831 and 851. Each mixer combines the filtered intermediate signal with a frequency associated with the predetermined offset frequency for each branch, +T, +nT, −T and −mT respectively. The elements and operation of each of the branches function identically from this point on, as such other processing branch 820 is discussed in detail.

The respected intermediate signal resulting from the mixing is demodulated in frequency demodulator 822 and the DC offset is removed by limiter loop 823. The limiter loop 823 also provides a fine tuning frequency differential * associated with the DC offset which fine tunes the predetermined frequency offset. The signal is then applied to a correlator 824 which correlates the MLS samples as detailed previously in regards to the detector algorithm. The output of the correlator 824 is applied to a logic circuit 825, which compares signal attributes to threshold relationships from 826. Upon reaching a positive threshold relationship the output of the logic circuit 825 releases the fine tuned frequency offset from a storage buffer 827 that in turn is used to adjusted the expected receive frequency at adder 804, thus adjusting the output of the VCO 803. The output of the buffer 822 is also used in narrowing the IF filter 804. If a signal is not detected in the respective branch, then the information contained in the buffer 822 is not released as it logically becomes inconsequential in determined the frequency offset. As mentioned previously if multiple branches detect a signal an additional logic circuit 808 can be used to select the branch with the greatest SNR and release only the offset information from the selected buffer.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method of detecting a communication signal in an environment with poor signal to noise ratio, the signal including a preamble comprising a plurality of frequency modulated Maximum Length Sequences (MLS's) of j symbols, j is a positive integer greater than 0, each and a predetermined period of pure carrier, comprising the steps of:
   (a) receiving a candidate signal
   (b) sampling a plurality of times for each symbol of the candidate signal
   (c) calculating a weighted frequency from successive samples of the symbols;
   (d) calculating a $1^{st}$ attribute of the candidate signal from the weighted frequencies;
   (e) calculating a $2^{nd}$ attribute of the candidate signal from the weighted frequencies;
   (f) comparing the magnitudes of the $1^{st}$ and $2^{nd}$ attributes to thereby determine whether a communication signal has been detected,
   wherein the weighted frequency is a weighted phase difference,
       wherein the sampling of the candidate figure determines real (Re) and imaginary (Im) components and the weighted frequency is calculated by the equation:

$$f[n]=Re\{z[n]\}\cdot Im\{z[n-1]\}-Im\{z[n]\}\cdot Re\{z[n-1]\}$$

wherein f[n] is the weighted frequency and z[n] is the candidate signal sample, and n is an integer.

2. The method of claim 1, wherein z[n] is stored for the calculation of f[n+1].

3. A method of detecting a communication signal in an environment with poor signal to noise ratio, the signal including a preamble comprising a plurality of frequency modulated Maximum Length Sequences (MLS's) of j symbols, j is a positive integer greater than 0, each and a predetermined period of pure carrier, comprising the steps of:
   (a) receiving a candidate signal
   (b) sampling a plurality of times for each symbol of the candidate signal
   (c) calculating a weighted frequency from successive samples of the symbols;
   (d) calculating a $1^{st}$ attribute of the candidate signal from the weighted frequencies;
   (e) calculating a $2^{nd}$ attribute of the candidate signal from the weighted frequencies;
   (f) comparing the magnitudes of the $1^{st}$ and $2^{nd}$ attributes to thereby determine whether a communication signal has been detected,
   wherein successive weighted frequencies are stored in a storage register, and shifting the storage register and appending the new weighted frequency.

4. The method of claim 3, wherein the storage register has an overall length of 746 bins.

5. A method of detecting a communication signal in an environment with poor signal to noise ratio, the signal including a preamble comprising a plurality of frequency modulated Maximum Length Sequences (MLS's) of j symbols, j is a positive integer greater than 0, each and a predetermined period of pure carrier, comprising the steps of:
   (a) receiving a candidate signal
   (b) sampling a plurality of times for each symbol of the candidate signal
   (c) calculating a weighted frequency from successive samples of the symbols;
   (d) calculating a $1^{st}$ attribute of the candidate signal from the weighted frequencies;
   (e) calculating a $2^{nd}$ attribute of the candidate signal from the weighted frequencies;

(f) comparing the magnitudes of the 1$^{st}$ and 2$^{nd}$ attributes to thereby determine whether a communication signal has been detected, wherein the calculation of the 1$^{st}$ and 2$^{nd}$ attributes includes the calculation of at least one of a partial energy, or a partial correlation of a partial average from the weighted frequencies.

6. The method of claim 5, wherein the 1$^{st}$ and 2$^{nd}$ attributes are calculated from at least one of the weighted frequencies for each symbol.

7. The method of claim 5, wherein the partial energy is calculated by the equation:

$$E_i = \sum_{n=M}^{M+30} f^2[k \cdot n]$$

where k=number of samples per symbol, and i=1 to the number of MLS sequences and M=(i−1)·j+1, and n is an integer.

8. The method of claim 5, wherein the partial correlation is calculated by the equation:

$$C_i = \sum_{n=M}^{M+30} f[k \cdot n] \cdot MLS[n - M]$$

where k=number of samples per symbol, and i=1 to the number of MLS sequences and M=(i−1)·j+1, and n is an integer.

9. The method of claim 5, wherein the partial average is calculated by the equation;

$$A_i = \sum_{n=M}^{M+30} f[k \cdot n]$$

where k=number of samples per symbol, and i=1 to the number of MLS sequences and M=(i−1)·j+1, and n is an integer.

10. The method of claim 5, wherein the communication signal is detected if the relationship:

$$E_i - A \cdot (C_i)^2 < \frac{1}{j} \cdot (A_i)^2$$

is achieved for each MLS sequence; where $E_i$ is the partial energy, $A_i$ is the partial average, $C_i$ is the partial correlation and A is the average of the partial averages; and, where i=1 of MLS sequences; and M=(i−1)·j+1.

11. A method of detecting a narrow band communication signal at an expected carrier frequency in an environment with poor signal to noise ratio and large frequency offsets, the communication signal comprising a preamble with a plurality of frequency modulated Maximum length Sequences (MLS's) of j symbols, j is a positive integer greater than 0, each, and a period of pure carrier, comprising the steps of:

(a) receiving a candidate signal;
(b) applying the candidate signal to a first mixer tuned to the expected carrier frequency of the communication signal to obtain a first intermediate signal at an intermediate frequency;
(c) supplying the first intermediate signal to a central processing branch,
(d) supplying the first intermediate signal to x, x is a positive integer greater than 0, number of upper parallel processing branches and to y, y is a positive integer greater than 0, number of lower parallel processing branches,
(e) adding a plurality of mixing signals at predetermined positive frequency offsets from the frequency of the first intermediate signal to each x number of upper parallel processing branches;
(f) adding a plurality of mixing signal at predetermined negative frequency offsets from the frequency of the first intermediate signal to each y number of lower parallel processing branches;
(g) in each processing branch:
  (i) sampling a plurality of times each symbol in the respective intermediate signal;
  (ii) calculating a weighted frequency from respective successive samples of the symbols;
  (iii) calculating a 1$^{st}$ attribute of the respective intermediate signal from the respective weighted frequencies;
  (iv) calculating a 2$^{nd}$ attribute of the respective intermediate signal form the respective weighted frequencies;
  (v) comparing the 1$^{st}$ and 2$^{nd}$ attributes to thereby determine whether a communication signal has been detected.

12. The method of claim 11, wherein the predetermined positive frequency offset is different for each upper parallel processing branch, thereby producing x number of intermediate signals.

13. The method of claim 11, wherein the predetermined negative frequency offset is different for each lower parallel processing branch, thereby producing y number of intermediate signals.

14. The method of claim 11, wherein the preamble comprises 3 MLS's.

15. The method of claim 14, wherein j=31 symbols.

16. The method of claim 14, wherein the respective intermediate signals are sampled 8 times per symbol.

17. The method of claim 11, wherein the weighted frequency is a weighted phase difference.

18. The method of claim 17, wherein the sampling of the intermediate signals determines real (Re) and imaginary (Im) components and the weighted frequency is calculated by the equation:

$$f[n]=Re\{z[n]\}\cdot Im\{z[n-1]\}-Im\{z[n]\}\cdot Re\{z[n-1]\}$$

wherein f[n] is the weighted frequency and z[n] is the intermediate signal sample, and n is an integer.

19. The method of claim 18, wherein z[n] is stored for the calculation of f[n+1].

20. The method of claim 11, wherein successive weighted frequencies are stored.

21. The method of claim 20, comprising the step of shifting a storage register in each processing branch and appending the new weighted frequency.

22. The method of claim 21, wherein the storage register has an overall length of 746.

23. The method of claim 11, wherein the calculation of the $1^{st}$ and $2^{nd}$ attributes includes the calculation of at least one of a partial energy, or a partial correlation or a partial average from the weighted frequencies.

24. The method of claim 23, wherein the partial energy, partial correlation and partial averages are calculated from at least one of the weighted frequencies for each symbol.

25. The method of claim 23, wherein the partial energy is calculated by the equation:

$$E_i = \sum_{n=M}^{M+30} f^2[k \cdot n]$$

where k=number of samples per symbol, and i=1 to the number of MLS sequences and M=(i−1)·j+1, and n is an integer.

26. The method of claim 23, wherein the partial correlation is calculated by the equation:

$$C_i = \sum_{n=M}^{M+30} f[k \cdot n] \cdot MLS[n-M]$$

where k=number of samples per symbol, and i=1 to the number of MLS sequences and M=(i−1)·j+1, and n is an integer.

27. The method of claim 23, wherein the partial average is calculated by the equation;

$$A_i = \sum_{n=M}^{M+30} f[k \cdot n]$$

where k=number of samples per symbol, and i=1 to the number of MLS sequences and M=(i−1)·j+1, and n is an integer.

28. The method of claim 23, wherein the communication signal is thereby detected if the relationship:

$$E_i - A \cdot (C_i)^2 < \frac{1}{j} \cdot (A_i)^2$$

is achieved for each MLS sequence; where $E_i$ is the partial energy, $A_i$ is the partial average, $C_i$ is the partial correlation and A is the average of the partial averages; and, where i=1 of MLS sequences; and M=(i−1)·j+1.

29. The method of claim 11, comprising the step of providing feed back to the first mixer from one of the processing branches in which the communication signal has been detected.

30. The method of claim 11, comprising the step of adjusting the filtering of the first intermediate signal from feedback from one of the processing branches.

31. The method of claim 29, wherein the feedback to the first mixer is fined tuned by the output of a respective limiter in one of the processing branches.

32. The method of claim 29, wherein the feedback to the first mixer is stored in a respective buffer until the respective one of the processing branches detects the communication symbol.

33. The method of claim 11, wherein the number of upper parallel processing branches is equal to the number of lower parallel processing branches.

34. The method of claim 33, wherein the number of upper parallel processing branches is 1.

35. A method of wide band acquisition of a high performance waveform, in an environment with poor signal to noise ratio, the waveform comprising a preamble with a plurality of frequency modulated Maximum length Sequences (MLS's) of j symbols, j is a positive integer greater than 0, and a period of pure carrier, comprising the steps of:
  providing an application specific integrated circuit (ASIC) for receiving the waveform;
  providing filters each with a predetermined coefficient for use with MLS portion of signal;
  detecting the communication signal through partial correlation of the MLS portion of the signal;
  extracting waveform information from the MLS portion of the preamble
  estimating symbol timing from the MLS portion of the preamble
  providing Filters each with a predetermined coefficient for the pure Carrier portion of signal
  estimating the carrier phase and frequency of the pure carrier portion of the preamble; and
  providing the estimated carrier phase and frequency to the ASIC to thereby acquire the high performance waveform.

36. The method of claim 35, wherein the step of estimating the carrier phase and frequency comprises the steps of:
  collecting phase samples from the pure carrier portion of the preamble;
  calculating phase difference in samples
  summing the phase differences to detect and correct click
  updating slope and intercept estimations; and,
  calculating frequency offset.

37. The method of claim 36, wherein the step of summing comprises continuously adding the phase differences to a running sum, and adjusting the phase difference according to a threshold value.

38. The method of claim 35, wherein every $6^{th}$ phase sample is collected.

39. The method of claim 35 wherein the slope and intercept estimations are implemented with a Finite implies response filter.

40. The method of claim 39, wherein the slope and intercept filter coefficients a[k] and b[k] are computed as follows:

$$a[k] = 6 \cdot \frac{2 \cdot k - N - 1}{N \cdot (N^2 - 1)}; \text{ and,}$$

$$b[k] = 2 \cdot \frac{2 \cdot N + 1 - 3 \cdot k}{N \cdot (N - 1)};$$

where N is the number of samples used in the estimation, and k is an integer.

41. The method of claim 35, wherein the preamble comprises 3 MLS's, and j=31 symbols.

42. An Application Specific Integrated Circuit for detecting a communication signal with a large frequency offset in an environment with a poor signal to noise ratio, the signal comprising a preamble including a plurality of MLS sequences of j symbols, j is a positive integer greater than 0, and a pure carrier signal, the ASIC comprising:
- a first mixer producing an intermediate signal;
- a first filter for filtering the intermediate signal;
- a central processing branch for processing the intermediate signal at an expected frequency;
- x, x is a positive integer greater than 0, number of positive processing branches for processing the intermediate signal at a frequency positively offset from the expected frequency;
- y, y is a positive integer greater than 0, number of negative processing branches for processing the intermediate signal at a frequency negatively offset from the expected frequency;
- each processing branch comprising:
  - a limiter for removing a respective DC offset;
  - a correlator for correlating the respective intermediate signal;
  - a logic circuit for comparing the outputs of the respective correlator to thereby detect a communication signal;
- wherein the first filter is adjusted by a feedback loop of the output of the logic circuits; and,
- wherein the first mixer is controlled in part by the output of the logic circuits.

43. The ASIC of claim 42 wherein the x number of positive processing branches is equal to the y number of negative processing branches.

44. The ASIC of claim 43, wherein there is one positive processing branch.

45. The ASIC of claim 42, further comprising a filter in each positive and negative processing branches for filtering the intermediate signal.

* * * * *